United States Patent Office 3,167,528
Patented Jan. 26, 1965

3,167,528
SILYLARYLENE COMPOSITIONS
James Marsden, Schenectady, N.Y., assignor to General Electric Company, a corporation of New York
No Drawing. Filed July 3, 1961, Ser. No. 121,313
6 Claims. (Cl. 260—46.5)

This application is a continuation-in-part of my earlier application Serial No. 755,138, filed August 15, 1958, now U.S. Patent 3,020,299, issued February 6, 1962, and assigned to the same assignee as the present invention.

This invention is concerned with novel silylarylene compositions. More particularly, the invention relates to a silylarylene polymer containing the recurring structural unit (I) 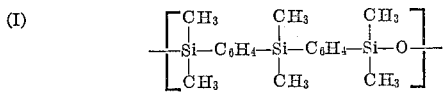

the —$C_6H_4$— group being a para-phenylene radical. Such polymers may have from 5 or 10 to 1,000 or more of such recurring units, in addition to which the polymer can have terminal silicon-bonded hydroxyl groups. Copolymers containing the above unit and other organosiloxy units are also included in the scope of the present invention.

Polymeric compositions containing the above recurring unit can be prepared from monomeric hydrolyzable halogenosilanes having the formula II) 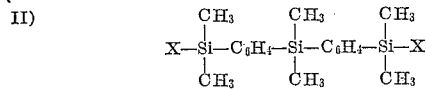

These monomeric silanes were prepared as follows:

Example 1

280 grams dimethyldichlorosilane, 52.5 grams magnesium, and 4000 ml. diethyl ether were placed in a three-necked reaction flask. Thereafter, 200 grams dimethyl-para-dibromophenylsilane [$BrC_6H_4Si(CH_3)_2C_6H_4Br$] dissolved in 540 ml. ether was added to the stirred reaction mixture over a period of 2.5 hours. The reaction mixture was heated at the reflux temperature of the mass for an additional 8 hours, and then filtered to remove magnesium halides. The solvent and unreacted dimethyldichlorosilane (which was employed in excess) was removed by distillation at atmospheric pressure. The resulting mixture (about 233 grams in weight) was distilled at reduced pressure to yield about 85 grams of a solid product boiling within the range of 175° C.–210° C. at 0.2 mm. Analysis of this compound showed that this product was a mixture of bis(para-dimethyl bromosilylphenyl)dimethylsilane and bis(para-dimethyl chlorosilylphenyl) dimethylsilane (and probably the mixed bromochloro derivative of Formula II where one X is chlorine and one X is bromine). In this mixture, there was present about 23 equivalent percent of the bromo derivative and about 77 equivalent percent of the chloro derivative as evidenced by the fact that analysis for chlorine and silicon of the mixture showed that the product contained 13.1% chlorine and 19.6% silicon as contrasted to the theoretical values of a similar mixture of 13.7% chlorine and 19.5% silicon. By distillation through a more efficient fractionating column, one can separate the bis-dichloro derivative from the bis-dibromo derivative.

The above-described halosilane product composed of the bromo and chlorosilanes which distilled within the range of 175–210° C. at 0.2 mm. was dissolved in 300 ml. diethyl ether and added slowly over a period of 2.5 hours with stirring to 1200 ml. of a saturated solution of sodium bicarbonate and 750 ml. ether. Stirring was then continued for an additional one hour at room temperature (about 27° C.). The organic solution was separated and dried with anhydrous sodium carbonate and filtered. The silanol product of hydrolysis thus obtained was recrystallized from hot toluene, and the white crystals obtained were found to have a melting point of 126° C. This compound was analyzed and found to correspond to Formula II where the silicon atoms are situated para to each other on the phenylene radical and each X is an hydroxyl group as evidenced by the fact that it was found to have 60.4% carbon, 8.2% hydrogen and 22.0% silicon as contrasted to the theoretical values for the disilanol of 60.1% carbon, 7.57% hydrogen, and 23.42% silicon. This structure was also confirmed by molecular weight determination.

The above prepared disilanol was polymerized with KOH in the presence of a stream of nitrogen which was passed over the surface of the polymerizing mass. More particularly about 4.6 ml. of KOH solution (0.0052 gram KOH per 100 ml. water) was added to 4.6 grams of the above-described disilanol. The water was removed by heating at about 80° C. and passing a stream of nitrogen over the surface of the mixture. After all the water was removed, the silanol was heated above its melting point to cause polymerization. Heating was continued for one-half hour at 160° C., one hour at 180–200° C., and 17 hours at 200–225° C. The resulting polymer was a viscous liquid at 150° C. and upon cooling to room temperature was an elastic solid. This polymer was dissolved in benzene and washed with water to remove the catalyst. The polymer was precipitated from the benzene solution with methyl alcohol. After removal of the solvent by evaporation, the polymer was a clear, elastic solid. It was comprised of a plurality of the recurring units

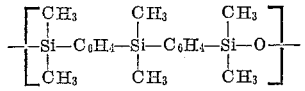

where the —$C_6H_4$— group was a para-phenylene radical.

This clear, elastic, solid polymer can be mixed with fillers such as finely divided silica (e.g., fume silica, silica aerogel, precipitated silica, etc.) in amounts ranging on a weight basis of from 0.2 to 2 parts filler per part of the solid polymer, and with small amounts of benzoyl peroxide or other organic peroxides capable of effecting cure of the polymer, the amount of peroxide used being within the range of from about 0.1 to 8%, by weight, based on the weight of the solid elastic product. This mixture of ingredients can be heated at elevated temperatures to about 125 to 250° C. for times ranging from 1 to 3 hours to effect cure and vulcanization of the mixture to the substantially infusible and insoluble state.

Such organopolysiloxane solids can be employed in various applications where the usual organopolysiloxane rubbers are used. Thus, these cured solid elastic polymers can be used as gasket materials where it is desired to have good heat resistance at elevated temperatures and yet have a gasket which is capable of remaining flexible at temperatures as low as −70 to −100° C. The uncured mixture of the solid elastic polymer, filler, and curing agent can also be dissolved and suspended in various solvents such as benzene and toluene, and used to coat various cloths, such as glass cloth, to make heat resistant tapes which can be used for insulation of various electrical apparatus including electrical conductors. Alternatively, a copper core can be passed through the solution-dispersion of the aforesaid elastic polymer, filler and curing agent, and thereafter the coated conductor can be passed into a heated zone to effect curing of the insulation to give a heat-resistant outer insulation for the metallic conductor. The dihalogenosilanes and the dihydroxy derivative of Formula II are useful as intermediates in the preparation of the polymeric methylpolysiloxanes described in Formula I. In addition, the halogenosilanes of Formula II can be used to treat various solid bodies, such as masonry, textiles, paper, etc., and thereafter allowing the treated body to hydrolyze by means of the moisture in the air, thereby to deposit a film on the solid body to render the latter water-repellent.

The dihydroxy derivatives of Formula I can be intercondensed with other organopolysiloxanes such as cyclic polysiloxanes (e.g., octamethylcyclotetrasiloxane, octaphenylcyclotetrasiloxane, etc.), to give interpolymers having recurring units such as Formula I, and in addition, dimethylsiloxy and diphenylsiloxy units.

In the broad sense, the polymeric compositions herein concerned can also include copolymeric compositions in which there are present recurring structural units of Formula I with one or more or all of other organosiloxy units of the formulas

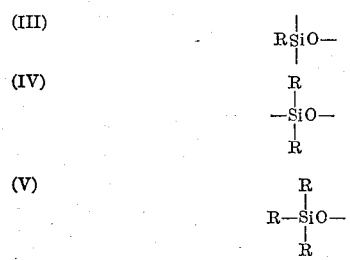

where R may be the same or different monovalent organic radicals selected from the class consisting of monovalent hydrocarbon radicals, halogenated monovalent hydrocarbon radicals and cyanoalkyl radicals. Among the radicals represented by R are, for instance, alkyl radicals (e.g., methyl, ethyl, propyl, isopropyl, butyl, octyl, etc., radicals); cycloalkyl radicals (e.g., cyclohexyl, cyclopentyl, cycloheptyl, etc., radicals); aryl radicals (e.g., phenyl, naphthyl, biphenyl, etc., radicals); alkaryl radicals (e.g., tolyl, xylyl, ethyl phenyl, etc., radicals); aralkyl radicals (e.g., benzyl, phenylethyl, etc., radicals); olefinically unsaturated radicals (e.g., vinyl, allyl, cyclohexenyl, styryl, etc., radicals); halogenated derivatives of the above monovalent hydrocarbon radicals (e.g., chloromethyl, beta-chloropropyl, chlorophenyl, dibromophenyl, tetrachlorophenyl, etc., radicals); cyanoalkyl radicals (e.g., those having the formula $$CN-(CH_2)_y CHR'-$$

where R' is selected from the class consisting of hydrogen, halogen, lower alkyl radicals of from 1 to 3 carbon atoms, and phenyl, for instance, cyanoethyl, cyanopropyl, alpha-methylcyanoethyl, alpha-phenylcyanoethyl, etc., radicals).

Among the radicals which may be represented by Formulas III, IV and V are, for instance, monomethylsiloxy units, monophenylsiloxy units, dimethylsiloxy units, methyl vinylsiloxy units, diethylsiloxy units, methyl ethylsiloxy units, diphenylsiloxy units, methyl phenylsiloxy units, methyl chlorophenylsiloxy units, methyl tetrachlorophenylsiloxy units, trifluoromethylphenyl methylsiloxy units, trimethylsiloxy units, triethylsiloxy units, triphenylsiloxy units, methyldiphenylsiloxy units, methyl cyanoethylsiloxy units, trifunctional cyanoethylsiloxy units, etc. Where organosiloxy units of Formulas III, IV and V are present in the polymeric composition containing also the recurring structural unit identified by Formula I, the former three organosiloxy units can be present in concentrations ranging from about 0.5 to as high as 99.5 mol percent of the total number of organosiloxy units present including the recurring unit of Formula I. Where one is concerned with homopolymers of the recurring unit of Formula I, the percentage of siloxy units of this formula will obviously equal 100 percent.

The organosiloxy units of Formulas III, IV and V can be incorporated by various means, for instance by cohydrolysis, intercondensation, interpolymerization, etc., to give compositions containing the latter organosiloxy units together with the recurring unit of Formula I. The following examples illustrate the manner in which copolymers can be prepared in which there are present recurring units of the formula

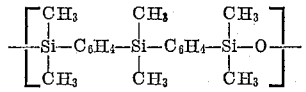

and units having the formula

where R is a methyl radical.

*Example 2*

In this example about 10 mol percent of the mixture of bis(para-dimethyl bromosilylphenyl) dimethylsilane and bis(para-dimethyl chlorosilylphenyl) dimethylsilane described in Example 1 is mixed with about 90 mol percent dimethyldichlorosilane, and the mixture of ingredients thereafter is treated with an amount of water sufficient to effect hydrolysis of all the silicon-bonded halogens. After the removal of the reaction product from the water of hydrolysis and washing with additional amounts of water to remove excess hydrohalide acid which may be present, a solid copolymeric composition is obtained composed of recurring units of the formulas

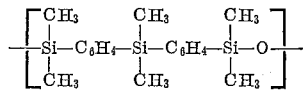

where the —$C_6H_4$— group is a para-phenylene radical, and

where the two units are essentially in the same molar ratio as the starting hydrolyzable silanes.

*Example 3*

In this example, 50 mol percent of the mixture of bis-(para-dimethyl bromosilylphenyl) dimethylsilane and bis-para-dimethyl chlorosilylphenyl) dimethylsilane is mixed with 25 mol percent dimethyldichlorosilane and 25 mol percent methyltrichlorosilane. This mixture of halogenosilanes, dissolved in a solvent mixture of equal parts by weight of toluene and n-butanol, wherein the solvent mixture is present in an amount equal, by weight, to from three parts of the latter per part of the halogenosilane mixture, is then treated with an amount of water sufficient to effect hydrolysis of all the silicon-bonded chlorine and bromine atoms to siloxy groups to give a polymeric structure composed of units of the formula

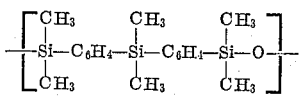

units of the formula

and units of the formula

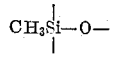

in essentially the same molar ratios as the molar ratios of the starting hydrolyzable silanes.

Another method for making these copolymeric compositions comprises reacting the silanol having the formula (VI)       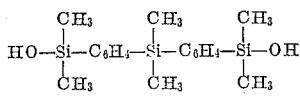

(as prepared in Example 1) with octamethylcyclotetrasiloxane in the presence of an alkaline interpolymerization agent such as potassium hydroxide, cesium hydroxide, quaternary ammonium hydroxides, quaternary phosphonium hydroxides, etc. as illustrated in the following examples.

Example 4

Fifty mol percent of the silanol represented by Formula VI is mixed with 50 mol percent octamethylcyclotetrasiloxane employing about 0.1 percent, by weight, KOH based on the total weight of the reactants. The mixture is then heated at a temperature of about 125°–150° C. for about 30 minutes to effect intercondensation and interpolymerization to yield a copolymeric composition containing units of Formula I and dimethylsiloxy units.

Example 5

In this example, the same procedure was employed as in Example 4, and the reactants chosen were the same with the exception that octaphenylcyclotetrasiloxane was used in place of the octamethylcyclotetrasiloxane to give a polymeric composition composed of recurring units defined by Formula I together with recurring units of the formula

Example 6

The same procedure was used in this example as in Example 5 employing the same ingredients with the exception that the octaphenylcyclotetrasiloxane was replaced by tetramethyltetracyanoethylcyclotetrasiloxane to give a rubbery polymeric structure composed of the recurring units defined in Formula I and units of the formula

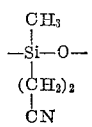

Example 7

Chain-stopped organopolysiloxane compositions containing the recurring units of the Formula I are obtained by interacting 0.1 mol percent hexamethyldisiloxane with the disilanol derivative of Formula VI in the presence of either an acid such as sulfuric acid or potassium hydroxide to give a polymeric composition having the formula

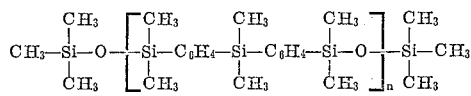

where $n$ has a value of from 5 to 1000 or more. By incorporating varying amounts (e.g., from 2 to 50 mol percent) of a source of dimethylsiloxy units, such as octamethylcyclotetrasiloxane, one obtains a chain-stopped fluid suitable for lubrication and hydraulic applications having the formula

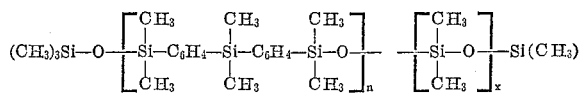

where $n$ has the value recited above and $x$ is a whole number equal to from 1 to 1000 or more. These materials are fluids which can be used as lubricants alone or with additives, such as grease-forming soaps, e.g., lithium stearate, especially under conditions of extreme pressures and elevated temperatures.

Example 8

Thirty-five mol percent of a mixture of bis(paradimethyl chlorosilylphenyl) dimethylsilane and bis(paradimethyl bromosilylphenyl) dimethylsilane is mixed with 65 mol percent of methyl phenyldichlorosilane. This mixture of ingredients is then added to an amount of water sufficient to effect hydrolysis of all the silicon-bonded chlorine and bromine atoms to siloxy groups to give a polymeric structure composed of units of the formula

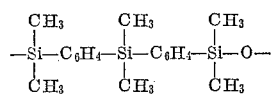

and units of the formula

where each of the siloxy units is present in essentially the same molar ratio as were the starting organohalogenosilanes.

From the preceding examples, it will be seen that in addition to the recurring unit of Formula I, there may be present in the organopolysiloxane composition other units generically having the formula (VII)       $R_mSiO_{\frac{4-m}{2}}$ where R has the meaning given above and $m$ is a whole number equal to from 1 to 3. Such copolymeric compositions (which may be resins, rubber, fluids, etc.) have the same uses as described for the homopolymeric compositions composed essentially of recurring units of Formula I. However, because of the presence of other organosiloxy units free of silylarylene linkages, they introduce additional flexibility which is inherent in organopolysiloxanes free of siloxy units of Formula I. These copolymeric compositions are especially useful where organopolysiloxane elastomers are employed because of their increased heat resistance imparted by means of the silylarylenesiloxy units of Formula I.

It will of course be apparent to those skilled in the art that in addition to the organosiloxy units present in the organopolysiloxanes of Examples 2 to 7, other organosiloxy units, many examples of which have been given above, may be substituted or even included with those recited in the aforesaid examples, to form the copolymers containing not only these units, but additionally, units of the Formula I. In addition, the proportions of the organosiloxy units may be varied widely, depending upon the particular organosiloxy unit under consideration, the product desired, the application for which the product will be used, etc. Generally, I prefer that the structural units of the Formula I comprise from 10 to 95 mol percent of the total number of organosiloxy units in the organopolysiloxane composition, i.e., the recurring units of Formula VII comprises from 5 to 90 mol percent. It will also be obvious that the above methods of making these organopolysiloxane compositions may be varied widely employing other methods now well known in the organopolysiloxane art.

What I claim as new and desire to secure by Letters Patent of the United States is:

1. A polymeric composition composed essentially of recurring structural units of the formula

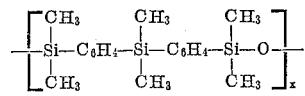

where $x$ is an integer from 10 to 1000 and the —$C_6H_4$— group is a para-phenylene radical.

2. An organopolysiloxane composition composed of from 10 to 95 mol percent of recurring structural units of the formula

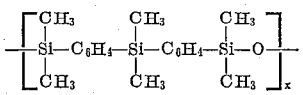

and from 5 to 90 mol percent of at least one unit of the formula

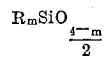

the total molar concentration of the aforesaid units being equal to 100 mol percent, where R is a monovalent organic radical selected from the class consisting of monovalent hydrocarbon radicals, halogenated monovalent hydrocarbon radicals, and cyanoalkyl radicals, $x$ is an integer equal to at least 10, $m$ is a number between 1 and 3 inclusive, and the —$C_6H_4$— group is a para-phenylene radical.

3. An organopolysiloxane composition composed of from 10 to 95 mol percent of recurring structural units of the formula

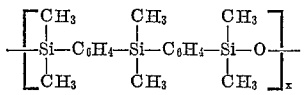

and from 5 to 90 mol percent of units of the formula

the total molar concentration of the aforesaid units being equal to 100 mol percent, where $x$ is an integer equal to at least 10, and the —$C_6H_4$— group is a para-phenylene radical.

4. An organopolysiloxane composition composed of from 10 to 95 mol percent of recurring structural units of the formula

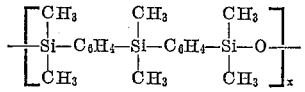

and from 5 to 90 mol percent of units of the formula

the total molar concentration of the aforesaid units being equal to 100 mol percent, where $x$ is an integer equal to at least 10, and the —$C_6H_4$— group being a para-phenylene radical.

5. An organopolysiloxane composition composed of from 10 to 95 mol percent of recurring structural units of the formula

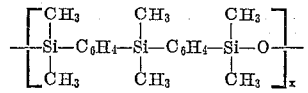

and from 5 to 90 mol percent of units of the formula

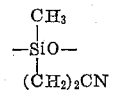

the total molar concentration of the aforesaid units being equal to 100 mol percent, where $x$ is an integer equal to at least 10, and the —$C_6H_4$— group is a para-phenylene radical.

6. A linear chain-stopped organopolysiloxane containing recurring structural units of the formula

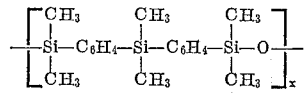

and terminal siloxy units of the formula $(CH_3)_3SiO_3O$—, there being present in said linear polysiloxane from 0 to 75 mol percent of units of the formula

where $x$ is an integer equal to at least 10, and the —$C_6H_4$— group is a paraphenylene radical, the total molar concentration of the aforesaid units being equal to 100 mol percent.

References Cited by the Examiner

UNITED STATES PATENTS

| | | | |
|---|---|---|---|
| 2,352,974 | 7/44 | Rochow | 260—46.5 |
| 2,507,515 | 5/50 | Clark | 260—448.2 |
| 2,557,913 | 6/51 | Barry | 260—46.5 |
| 2,562,000 | 7/51 | Sveda | 260—46.5 |

FOREIGN PATENTS 696,572   9/53   Great Britain.

MURRAY TILLMAN, *Primary Examiner.*

MILTON STERMAN, WILLIAM H. SHORT,
*Examiners.*